United States Patent
Chen et al.

(10) Patent No.: US 11,195,098 B2
(45) Date of Patent: Dec. 7, 2021

(54) METHOD FOR GENERATING NEURAL NETWORK AND ELECTRONIC DEVICE

(71) Applicant: Beijing Horizon Robotics Technology Research and Development Co., Ltd., Beijing (CN)

(72) Inventors: Yukang Chen, Beijing (CN); Qian Zhang, Beijing (CN); Chang Huang, Beijing (CN)

(73) Assignee: Beijing Horizon Robotics Technology Research and Development Co., Ltd., Beijing (CN)

( * ) Notice: Subject to any disclaimer, the term of this patent is extended or adjusted under 35 U.S.C. 154(b) by 304 days.

(21) Appl. No.: 16/666,344

(22) Filed: Oct. 28, 2019

(65) Prior Publication Data
US 2020/0134471 A1  Apr. 30, 2020

(30) Foreign Application Priority Data
Oct. 29, 2018 (CN) .......................... 201811269254.8

(51) Int. Cl.
*G06N 3/08* (2006.01)
*G06K 9/62* (2006.01)
*G06N 20/20* (2019.01)
*G06N 3/04* (2006.01)

(52) U.S. Cl.
CPC ........... *G06N 3/086* (2013.01); *G06K 9/6227* (2013.01); *G06N 3/0454* (2013.01); *G06N 20/20* (2019.01)

(58) Field of Classification Search
CPC ...... G06N 3/086; G06N 20/20; G06N 3/0454; G06K 9/6227

USPC ........................................................... 706/25
See application file for complete search history.

(56) References Cited

U.S. PATENT DOCUMENTS 7,363,281 B2 * 4/2008 Jin .......................... G06N 3/126
706/13
2018/0260713 A1 * 9/2018 Liang .................. G06N 3/0454

OTHER PUBLICATIONS

Young, et al., "Optimizing Deep Learning Hyper-Parameters Through an Evolutionary Algorithm", MLHPC'15: Proceedings of the Workshop on machine learning in high-performance computing environments, Nov. 2015 (Year: 2015).*

* cited by examiner

*Primary Examiner* — Tsu-Chang Lee
(74) *Attorney, Agent, or Firm* — Westbridge IP LLC (57) ABSTRACT

Disclosed are a method for generating a neural network, an apparatus thereof, and an electronic device. The method includes: obtaining an optimal neural network and a worst neural network from a neural network framework by using an evolutionary algorithm; obtaining an optimized neural network from the optimal neural network by using a reinforcement learning algorithm; updating the neural network framework by adding the optimized neural network into the neural network framework and deleting the worst neural network from the neural network framework; and determining an ultimately generated neural network from the updated neural network framework. In this way, a neural network is optimized and updated from a neural network framework by combining the evolutionary algorithm and the reinforcement learning algorithm, thereby automatically generating a neural network structure rapidly and stably.

11 Claims, 7 Drawing Sheets

METHOD FOR GENERATING NEURAL NETWORK AND ELECTRONIC DEVICE

CROSS-REFERENCE TO RELATED APPLICATION

This application claims the priority to Chinese Patent Application Serial No. 201811269254.8, filed on Oct. 29, 2018, the entire contents of which are incorporated herein by reference for all purposes.

TECHNICAL FIELD

The present application relates to the field of deep learning and neural networks, and more specifically, to a method for generating a neural network and an electronic device.

BACKGROUND

At present, deep learning and neural networks have been widely used in fields of computer vision, natural language processing, speech signal processing, and the like. In addition, the deep learning and the neural networks also show a level close to or beyond that of human being in the fields of image classification, object detection, semantic segmentation, text translation, and the like.

In view of the foregoing application fields, various neural network structures are designed to resolve specific problems in various fields. However, these neural network structures are manually designed by human experts. A lot of manual prior experience and a large number of experimental verifications are required, and a lot of computing resources and time are needed for continuous attempts. In addition, the manually designed neural network structures cannot be adaptively transformed for different tasks, and transportability is poor.

Therefore, it is desirable to provide a solution for generating a neural network.

SUMMARY

To resolve the foregoing technical problem, the present application is proposed. Embodiments of the present application provide a method for generating a neural network and an electronic device, which optimize and update a neural network from a neural network framework by combining an evolutionary algorithm and a reinforcement learning algorithm, thereby automatically generating a neural network structure rapidly and stably.

According to an aspect of the present application, a method for generating a neural network is provided, including: obtaining an optimal neural network and a worst neural network from a neural network framework by using an evolutionary algorithm; obtaining an optimized neural network from the optimal neural network by using a reinforcement learning algorithm; updating the neural network framework by adding the optimized neural network into the neural network framework and deleting the worst neural network from the neural network framework; and determining an ultimately generated neural network from the updated neural network framework.

According to another aspect of the present application, an apparatus for generating a neural network is provided, including: an evolutionary unit, configured to obtain an optimal neural network and a worst neural network from a neural network framework by using an evolutionary algorithm; a reinforcement learning unit, configured to obtain, by using a reinforcement learning algorithm, an optimized neural network from the optimal neural network obtained from the evolutionary unit; an update unit, configured to update the neural network framework by adding, into the neural network framework, the optimized neural network obtained from the reinforcement learning unit and deleting, from the neural network framework, the worst neural network obtained from the evolutionary unit; and a selection unit, configured to determine an ultimately generated neural network from a neural network framework updated by the update unit.

According to still another aspect of the present application, an electronic device is provided, including: a processor; and a memory, where the memory stores computer program instructions, and when the computer program instructions are executed by the processor, the processor is enabled to perform the method for generating a neural network described above.

According to yet another aspect of the present application, a computer-readable media is provided, and the computer-readable media stores computer program instructions, and when the computer program instructions are executed by the processor, the processor is enabled to perform the method for generating a neural network described above.

Compared with the prior art, the method for generating a neural network and generation apparatus, and the electronic device provided in the present application may obtain an optimal neural network and a worst neural network from a neural network framework by using an evolutionary algorithm; obtain an optimized neural network from the optimal neural network by using a reinforcement learning algorithm; update the neural network framework by adding the optimized neural network into the neural network framework and deleting the worst neural network from the neural network framework; and determine an ultimately generated neural network from the updated neural network framework. In this way, since the neural network framework is updated based on feedback of each evolutionary result by replacing random variation in the evolutionary algorithm with the reinforcement learning algorithm, a speed and stability of generating a neural network can be improved.

BRIEF DESCRIPTION OF DRAWINGS

The foregoing and other objectives, features and advantages of the present application become more apparent by describing embodiments of the present application in more detail with reference to the accompanying drawings. The accompanying drawings are used to provide a further understanding of the embodiments of the present application and constitute a part of the specification. The accompanying drawings are used together with the embodiments of the present application to explain the present application and do not constitute any limitation on the present application. In the accompanying drawings, a same reference sign generally represents a same part or step.

DETAILED DESCRIPTION OF THE EMBODIMENTS

Exemplary embodiments according to the present application are described in detail below with reference to the accompanying drawings. Apparently, the described embodiments are only a part of the embodiments of the present application, not all the embodiments of the present application. It should be understood that the present application is not limited to the exemplary embodiments described herein.

Overview

As mentioned above, in order to resolve a problem of neural network design in deep learning, an adaptive network structure search manner is mainly adopted currently. For example, for a classic image classification task in computer vision, one method is NAS (Neural Architecture Search), which needs to run on 800 pieces of GPUs for 28 days; and another method is NasNet, which needs 500 pieces of GPUs and four days. Such computing resources and time costs are unacceptable in many cases.

To resolve the foregoing technical problems, a basic concept of the present application is to, in combination with an evolutionary algorithm and a reinforcement learning algorithm, optimize an optimal neural network selected by using the evolutionary algorithm and update a neural network framework based on feedback of each evolutionary result by replacing random variation in the evolutionary algorithm with the reinforcement learning algorithm.

Specifically, the present application provides a method and apparatus for generating a neural network, and an electronic device. First, an optimal neural network and a worst neural network are obtained from a neural network framework by using an evolutionary algorithm; then an optimized neural network is obtained from the optimal neural network by using a reinforcement learning algorithm; after that the neural network framework is updated by adding the optimized neural network into the neural network framework and deleting the worst neural network from the neural network framework; and finally an ultimately generated neural network is determined from the updated neural network framework.

In this way, the random variation in the evolutionary algorithm is replaced with the optimal neural network obtained by optimizing the evolutionary algorithm by using the reinforcement learning algorithm, which is more consistent with a concept used by human experts to design a neural network structure. Moreover, updating the neural network framework based on feedback of each evolutionary result instead of performing selection layer by layer toughly can improve a speed of generating a neural network. In addition, since a manner of random variation is used in a traditional evolutionary algorithm, when detrimental variation accumulates to a certain extent, evolution stagnates or even collapses. According to the present application, stability of generating the neural network can be improved.

After the basic principle of the present application is introduced, various non-limiting embodiments of the present application are specifically described with reference to the accompanying drawings.

Exemplary Methods

Figure 1:
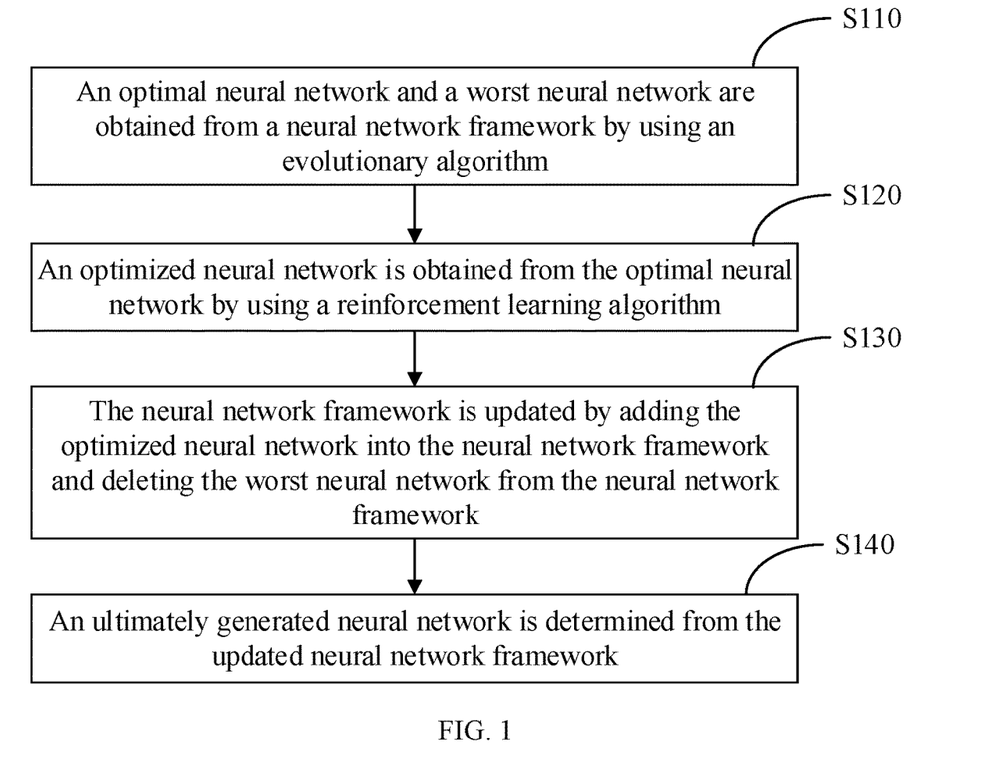
FIG. 1 is a flowchart of a method for generating a neural network according to an embodiment of the present application.

FIG. 1 is a flowchart of a method for generating a neural network according to an embodiment of the present application. The generation method of FIG. 1 is performed by a processor (for example, a GPU or CPU) of an electronic device.

As shown in FIG. 1, the method for generating a neural network according to the embodiment of the present application includes the following steps.

In step S110, an optimal neural network and a worst neural network are obtained from a neural network framework by using an evolutionary algorithm.

Figure 2:
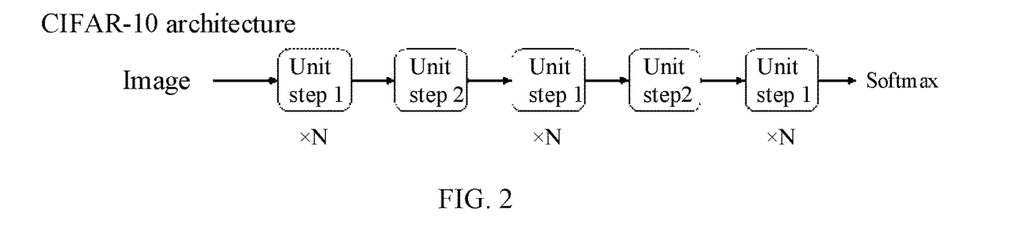
FIG. 2 is a schematic architectural diagram of a CIFAR-10 neural network according to an embodiment of the present application.
Figure 3:
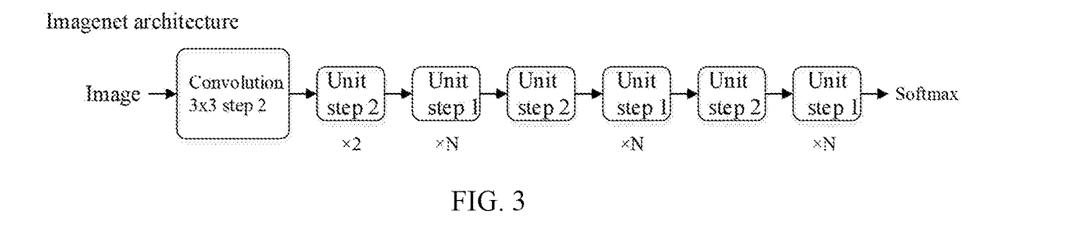
FIG. 3 is a schematic architectural diagram of an ImageNet neural network according to an embodiment of the present application.

Herein, in this embodiment of the present application, the neural network framework may include various neural network structures designed for different application fields, such as a CIFAR-10 neural network architecture shown in FIG. 2, and an ImageNet neural network architecture shown in FIG. 3. FIG. 2 is a schematic architectural diagram of the CIFAR-10 neural network according to an embodiment of the present application, and FIG. 3 is a schematic architectural diagram of the ImageNet neural network according to an embodiment of the present application.

In this embodiment of the present application, each neural network structure includes a plurality of neural network modules. This is because, in a process of generating a neural network structure, if search is directly performed in the network structure without any limitation condition, search space is too large, resulting in that the search is too time-consuming, the search is bogged down, and a desired result cannot be obtained.

Therefore, in this embodiment of the present application, a network structure that needs to be searched is normalized into a structure including modules, so that in the search process, it is unnecessary to search the entire network structure, and the search space is limited to the modules, thereby implementing proper acceleration. For different tasks or data sets, control of a network depth and a model size may be implemented by assembling different quantities of modules.

In addition, in this embodiment of the present application, the neural network may be a convolutional neural network (CNN), or may be another neural network, for example, a recurrent neural network (RNN).

Herein, according to the evolutionary algorithm, a structure of a single neural network structure is considered as an individual in a population, to gradually implement variation, elimination and evolution of the neural network structure, thereby implementing gradual optimization of the neural network structure. Different evaluation indexes may be used to determine the optimal neural network and the worst neural network. For example, in this embodiment of the present application, precision of a neural network is used for evaluation, that is, a neural network having optimal precision is the optimal neural network, and a neural network having worst precision is the worst neural network. Additional details of the evolutionary algorithm are detailed below.

In step S120, an optimized neural network is obtained from the optimal neural network by using a reinforcement learning algorithm. In this embodiment of the present application, the reinforcement learning algorithm is used to perform selection layer by layer for a type and a connection mode of each layer in the neural network structure, to optimize the neural network structure. Details of the reinforcement learning algorithm in this embodiment of the present application are described in detail below.

In step S130, the neural network framework is updated by adding the optimized neural network into the neural network framework and deleting the worst neural network from the neural network framework.

In other words, after the optimized neural network is obtained from the optimal neural network by using the reinforcement learning algorithm in step S120, the optimized neural network is returned into the neural network framework together with a result of the worst neural network obtained in step S110, thereby updating the neural network framework by adding the optimized neural network and deleting the worst neural network.

Finally, in step S140, an ultimately generated neural network is determined from the updated neural network framework.

Therefore, in the method for generating a neural network according to the embodiment of the present application, the neural network framework is updated by using the evolutionary algorithm based on feedback of each evolutionary result instead of performing selection layer by layer toughly, so that a speed of generating a neural network can be improved.

In addition, since a manner of random variation is used in a traditional evolutionary algorithm, when detrimental variation accumulates to a certain extent, evolution stagnates or even collapses. Comparatively, in this embodiment of the present application, the random variation in the evolutionary algorithm is replaced with the optimal neural network obtained by optimizing the evolutionary algorithm by using the reinforcement learning algorithm, which is more consistent with a concept used by human experts to design a neural network structure and can improve stability of generating the neural network.

The evolutionary algorithm according to the embodiment of the present application is described in detail below with reference to FIG. 4 and FIG. 5.

Figure 4:
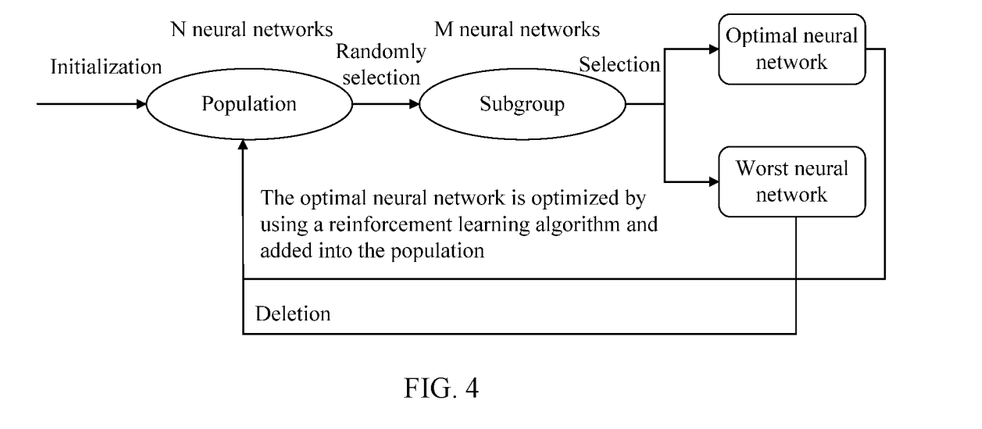
FIG. 4 is a schematic diagram of a network structure of an evolutionary algorithm according to an embodiment of the present application.
Figure 5:
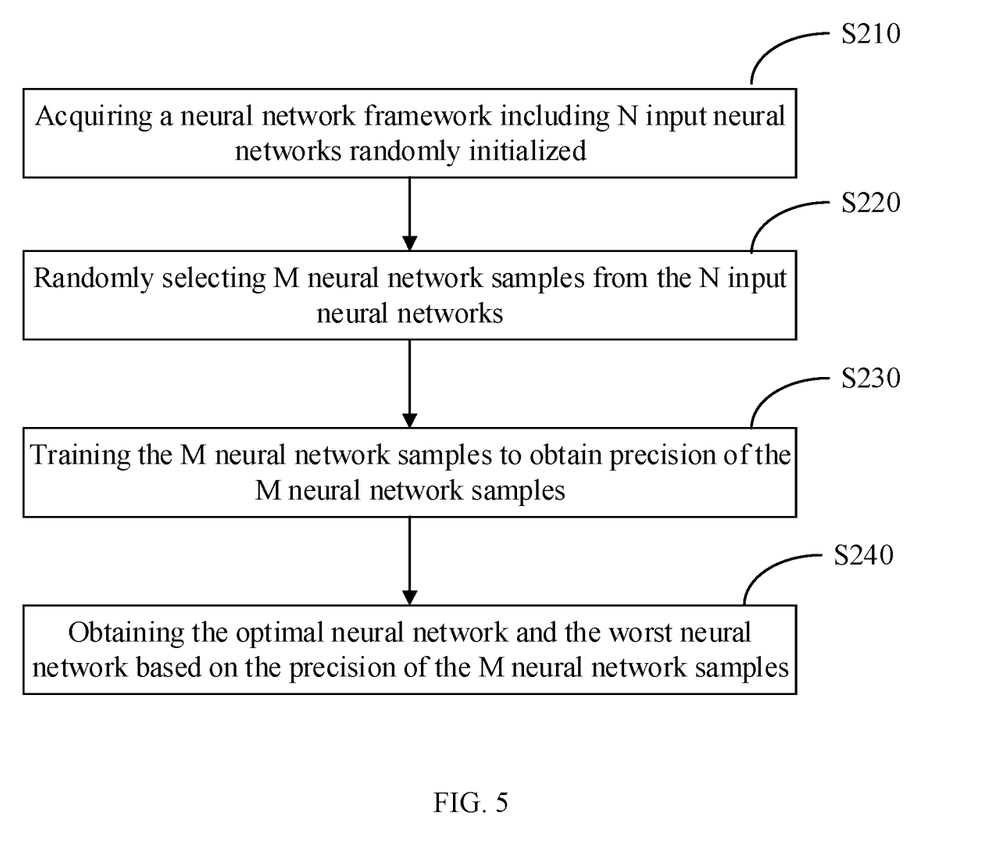
FIG. 5 is a flowchart of a process of obtaining an optimal neural network and a worst neural network by using an evolutionary algorithm according to an embodiment of the present application.

FIG. 4 is a schematic diagram of a network structure of an evolutionary algorithm according to an embodiment of the present application. FIG. 5 is a flowchart of a process of obtaining an optimal neural network and a worst neural network by using an evolutionary algorithm according to an embodiment of the present application. As shown in FIG. 5, based on the embodiment shown in FIG. 1, step S110 may include the following steps: S210: acquiring a neural network framework including N input neural networks randomly initialized, where N is an integer greater than 1; S220: randomly selecting M neural network samples from the N input neural networks, where M is an integer greater than 1; S230: training the M neural network samples to obtain precision of the M neural network samples; and S240: obtaining the optimal neural network and the worst neural network based on the precision of the M neural network samples.

Therefore, the obtained optimal neural network, for example, the neural network having highest precision, is optimized by using the reinforcement learning algorithm and added into a population, and the worst neural network, for example, the neural network having lowest precision, is deleted from the population, thereby updating the population.

In addition, in the embodiment of the present application, the neural network framework may be updated in an iterative manner. In other words, the above steps S110, S120 and S130 may be performed in an iterative manner to update the neural network framework. Therefore, the neural network framework including the N optimized neural networks can be obtained through loop iteration.

Therefore, using the evolutionary algorithm instead of performing selection layer by layer toughly is more consistent with a concept used by a human expert to design a neural network structure, and modification may be performed based on feedback from each update result to improve a speed of generating the neural network.

In addition, when the precision of the neural network is calculated, weight sharing between network structures may be used to reduce a time required to evaluate a single network, thereby accelerating generation of the neural network.

Figure 6:
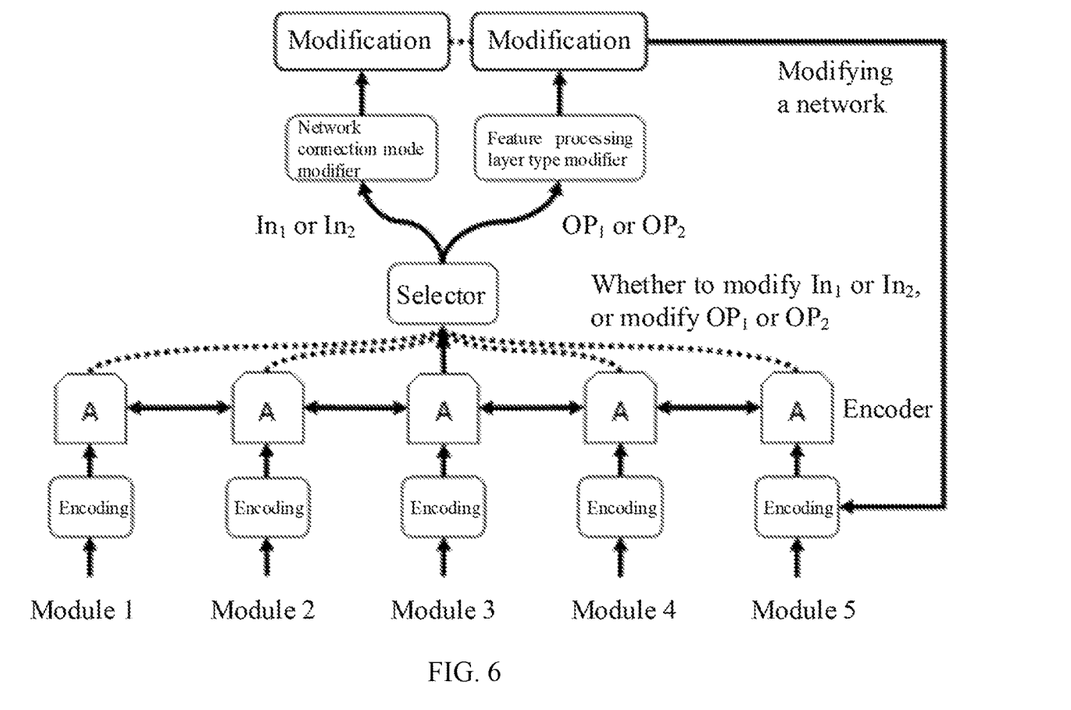
FIG. 6 is a schematic diagram of a network structure of a reinforcement learning algorithm according to an embodiment of the present application.
Figure 7:
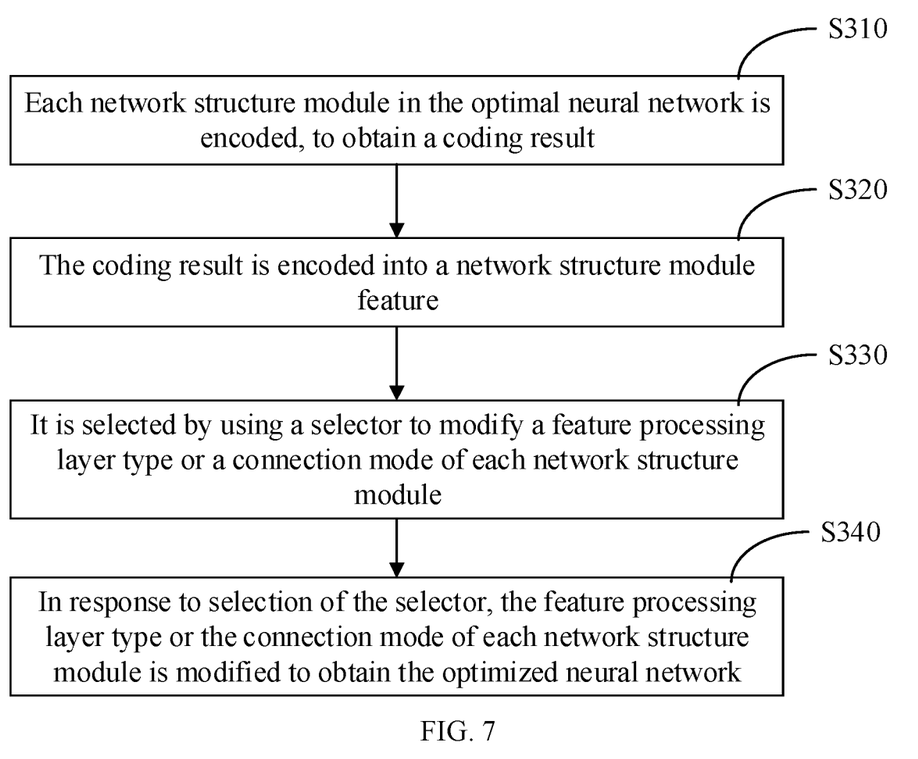
FIG. 7 is a flowchart of a process of optimizing an optimal neural network by using a reinforcement learning algorithm according to an embodiment of the present application.

FIG. 6 is a schematic diagram of a network structure of a reinforcement learning algorithm according to an embodiment of the present application. FIG. 7 is a flowchart of a process of optimizing an optimal neural network by using a reinforcement learning algorithm according to an embodiment of the present application. As shown in FIG. 7, based on the embodiment shown in FIG. 1, step S210 may include the following steps.

S310. Each network structure module in the optimal neural network is encoded to obtain a coding result. With reference to FIG. 6, assuming that the optimal neural network obtained by using an evolutionary algorithm in step S110 is a CIFAR-10 neural network architecture shown in FIG. 2, each network structure module, such as unit step 1, unit step 2, or the like in FIG. 2, is encoded to obtain a coding result. Specifically, each network structure module may be encoded as a one-hot code.

Therefore, a network structure that needs to be searched is normalized into a structure including modules and encoded, so that in the search process, it is unnecessary to search the entire network structure, and search space is limited to the modules, thereby implementing proper acceleration. In addition, for different tasks or data sets, control of a network depth and a model size may be implemented by assembling different quantities of modules.

S320. The coding result is encoded into a network structure module feature. Specifically, the coding result is encoded into the network structure module feature by using an encoder, for example, a bidirectional long short-term memory (Bi-LSTM).

S330. It is selected by using a selector to modify a feature processing layer type or a connection mode of each network structure module.

Figure 8:
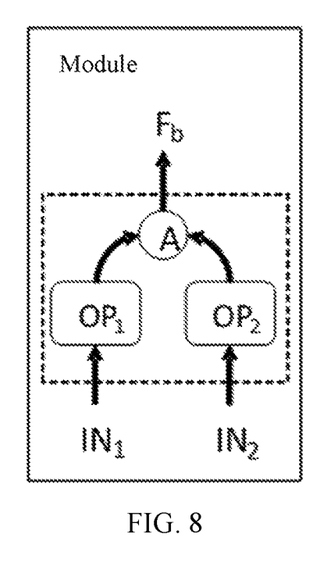
FIG. 8 is a schematic diagram of each network structure module in the neural network architecture.

FIG. 8 is a schematic diagram of each network structure module in the neural network architecture. As shown in FIG. 8, each network structure module includes a feature processing layer, for example, feature processing layer $OP_1$ and feature processing layer $OP_2$, which receive input $IN_1$ and input $IN_2$, respectively, and perform corresponding processing. Specifically, the feature processing layers $OP_1$ and $OP_2$ represent performing a basic operation such as convolution and pooling in a neural network, and the input $IN_1$ and the input $IN_2$ refer to output features of a previous layer. For example, if an initial input is an image and the previous layer is a pool layer, the input $IN_1$ and the input $IN_2$ are image features after pooling.

Herein $OP_1$ and $OP_2$ are feature processing layer types of the network structure module, and that $OP_1$ receives the input $IN_1$ and $OP_2$ receives the input $IN_2$ are connection modes of the network structure module. Then, an operation result generated through $OP_1$ and $OP_2$, for example, a pooling image feature encoded by an encoder, is output as an output feature $F_b$, such as a feature vector.

S340. In response to selection of the selector, the feature processing layer type or the connection mode of each network structure module is modified to obtain the optimized neural network.

In this way, the optimized neural network can be obtained by modifying the feature processing layer type or the connection mode of each network structure module in response to selection of the selector. Therefore, because the random variation in the evolutionary algorithm is replaced with the reinforcement learning algorithm, compared with the traditional evolutionary algorithm, when detrimental variation accumulates to a certain extent, evolution stagnates or even collapses, thereby improving stability of generating the neural network.

Specifically, in this embodiment of the present application, in response to selection of the selector, the feature processing layer type of each network structure module is modified, and one of feature processing layer types of each network structure module is selected by using a feature processing layer type modifier. In addition, in response to selection of the selector, the connection mode of each network structure module is modified, and one of connection modes of each network structure module is selected by using a network connection mode modifier.

Therefore, referring to FIG. 6, effective optimization of the network structure module can be obtained relative to random variation by selecting $OP_1$ or $OP_2$ through the feature processing layer type modifier or by selecting to receive $IN_1$ or $IN_2$ through the network connection mode modifier, thereby improving a speed of generating the neural network.

As mentioned above, in the evolutionary algorithm, precision of the neural network is selected to evaluate the neural network. In step S140 shown in FIG. 1, a same evaluation index, namely, the precision of the neural network, may also be used to determine an ultimately generated neural network. In addition, it should be noted that, after an updated neural network framework is obtained, a plurality of neural networks, such as the foregoing N neural networks, in the updated neural network framework further need to be trained, to make the neural networks converge, and then precision of each converged neural network is calculated to select a neural network having optimal precision as the ultimately generated neural network. Therefore, a precision requirement of the ultimately generated neural network can be ensured.

After testing, according to the method for generating a neural network according to the embodiment of the present application, a current optimal performance, including an amount of computation and precision, can be achieved by using four GPUs and about 1.5-day training on a classical dataset, for example, ImageNet.

Exemplary Apparatuses

Figure 9:
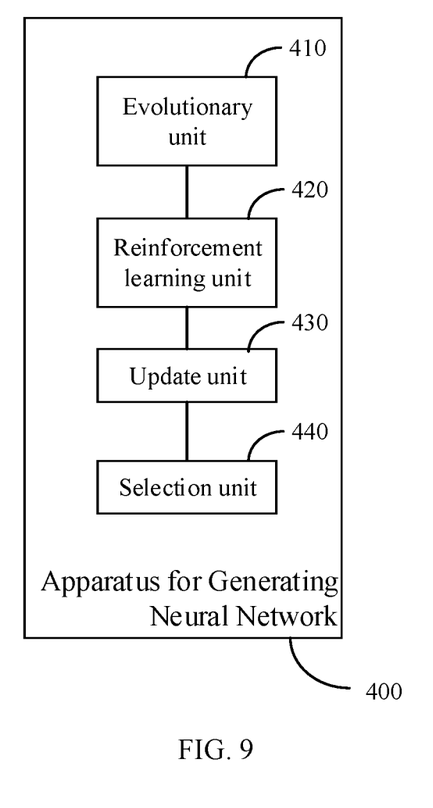
FIG. 9 is a block diagram of an apparatus for generating a neural network according to an embodiment of the present application.

FIG. 9 is a block diagram of an apparatus for generating a neural network according to an embodiment of the present application.

As shown in FIG. 9, an apparatus for generating a neural network 400 according to an embodiment of the present application includes: an evolutionary unit 410, configured to obtain an optimal neural network and a worst neural network from a neural network framework by using an evolutionary algorithm; a reinforcement learning unit 420, configured to obtain, by using a reinforcement learning algorithm, optimized neural network from the optimal neural network obtained from the evolutionary unit 410; an update unit 430, configured to update the neural network framework by adding, into the neural network framework, the optimized neural network obtained from the reinforcement learning unit 420 and deleting, from the neural network framework, the worst neural network obtained from the evolutionary unit 410; and a selection unit 440, configured to determine an ultimately generated neural network from a neural network framework updated by the update unit 430.

In an example, in the foregoing neural network generating apparatus 400, the evolutionary unit 410 includes: an acquiring subunit, configured to acquire a neural network framework including randomly initialized N input neural networks, where N is an integer greater than 1; a selection subunit, configured to randomly select M neural network samples from the N input neural networks acquired by the acquiring subunit, where M is an integer greater than 1; a training subunit, configured to train the M neural network samples selected by the selection subunit to obtain precision of the M neural network samples; and an obtaining subunit, configured to obtain the optimal neural network and the worst neural network based on the precision of the M neural network samples obtained by the training subunit.

In an example, in the foregoing neural network generating apparatus 400, the reinforcement learning unit 420 includes: coding subunit, configured to encode each network structure module in the optimal neural network, to obtain a coding result; a feature obtaining subunit, configured to encode the coding result obtained by the encoding subunit into a network structure module feature; a selection subunit, configured to select, by using a selector, to modify a feature processing layer type or a connection mode of each network structure module obtained based on encoding of the feature obtaining subunit; and a modification subunit, configured to modify, in response to selection of the selector made by the selection subunit, the feature processing layer type or the connection mode of each network structure module to obtain the optimized neural network.

In an example, in the foregoing neural network generating apparatus 400, the modification subunit includes: a feature processing layer type modifier, configured to modify, in response to selection of the selector, the feature processing layer type of each network structure module, and select one of feature processing layer types of each network structure module; and a network connection mode modifier, configured to modify, in response to selection of the selector, the connection mode of each network structure module, and select one of connection modes of each network structure module.

In an example, in the foregoing neural network generating apparatus 400, the selection unit 440 includes: a training subunit, configured to train the plurality of updated neural networks to enable the plurality of neural networks to converge; a computation subunit, configured to calculate precision of each of the plurality of converged neural networks which has converged; and a selection subunit, configured to select a neural network having optimal precision as the ultimately generated neural network.

Herein, a person skilled in the art may understand that specific functions and operations of units and modules in the neural network generation apparatus 400 have been described in detail in the foregoing descriptions of the method for generating a neural networks with reference to FIG. 1 to FIG. 8, and therefore, repeated descriptions thereof are omitted herein.

As described above, the neural network generation apparatus 400 according to the embodiment of the present application may be implemented in various terminal devices, such as a server used for neural network generation. In an example, the neural network generation apparatus 400 according to the embodiment of the present application may be integrated into a terminal device as a software module and/or a hardware module. For example, the neural network generation apparatus 400 may be a software module in an operating system of the terminal device, or may be an application program developed for the terminal device. Certainly, the neural network generation apparatus 400 may also be one of a plurality of hardware modules of the terminal device.

Alternatively, in another example, the neural network generation apparatus 400 and the terminal device may also be separate devices, and the neural network generation apparatus 400 may be connected to the terminal device via a wired and/or wireless network and transmit interactive information in an agreed data format.

Exemplary Electronic Devices

Figure 10:
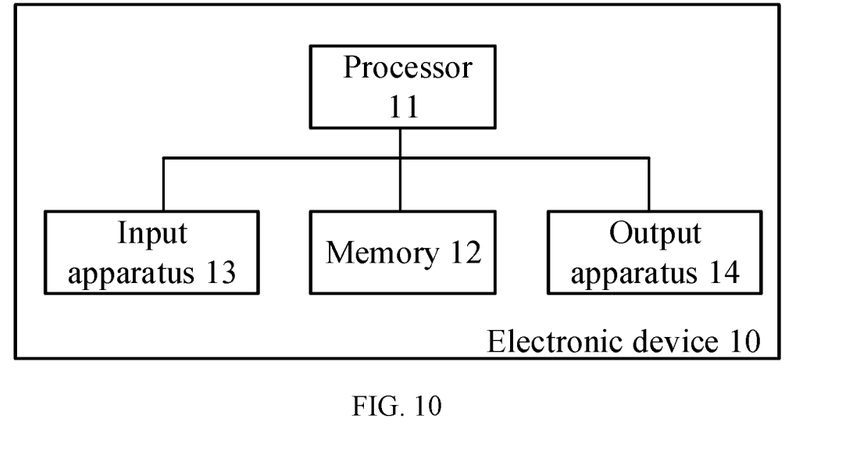
FIG. 10 is a block diagram of an electronic device according to an embodiment of the present application.

The following describes an electronic device according to an embodiment of the present application with reference to FIG. 10.

FIG. 10 is a block diagram of an electronic device according to an embodiment of the present application.

As shown in FIG. 10, an electronic device 10 includes one or more processors 11 and a memory 12.

The processor 11 may be a central processing unit (CPU) or another form of processing unit with data processing capability and/or instruction execution capability, and may control another component in the electronic device 10 to perform an expected function.

The memory 12 may include one or more computer program products, which may include various forms of computer-readable storage media, such as a volatile memory and/or non-volatile memory. The volatile memory may include, for example, a random access memory (RAM) and/or a cache (cache). The non-volatile memory may include, for example, a read-only memory (ROM), a hard disk, and a flash memory. The compute-readable storage media may store one or more computer program instructions, and the processor 11 may execute the program instructions to implement the method for generating a neural network and/or other expected functions of the embodiments in the present application described above. The compute-readable storage media may further store various types of content such as an optimal neural network, a worst neural network, and an optimized neural network.

In an example, the electronic device 10 may further include an input apparatus 13 and an output apparatus 14, and these components are interconnected by using a bus system and/or another form of connection mechanism (not shown).

The input apparatus 13 may include, for example, a keyboard, and a mouse.

The output apparatus 14 may output various types of information to the outside, including an ultimately generated neural network and the like. The output apparatus 14 may include, for example, a display, a speaker, a printer, a communications network, and a remote output device connected to the communications network.

Certainly, for simplicity, only some of the components related to the present application in the electronic device 10 are shown in FIG. 10, and components such as a bus, and an input/output interface are omitted. In addition, the electronic device 10 may further include any other suitable component depending on a specific application case.

Exemplary Computer Program Products and Computer-Readable Storage Media

In addition to the foregoing methods and devices, an embodiment of the present application may also be a computer program product that includes computer program instructions. When the computer program instructions are executed by a processor, the processor is enabled to perform the steps of the method for generating a neural network according to the embodiments of the present application described in the "Exemplary Methods" part of this specification.

The computer program product may write program code for performing the operations of the embodiments of the present application in any combination of one or more programming languages, and the programming languages include object-oriented programming languages such as Java and C++, and further include conventional procedural programming languages such as "C" or similar programming languages. The program code may be executed entirely on a user electronic device, partly on a user device, as a stand-alone software package, partly on a user electronic device while partly on a remote electronic device, or entirely on a remote electronic device or a server.

In addition, an embodiment of the present application may also be a computer-readable storage media, where the computer-readable storage media stores computer program instructions. When the computer program instructions are executed by a processor, the processor is enabled to perform the steps of the method for generating a neural network according to the embodiments of the present application described in the "exemplary method" part of this specification.

The computer-readable storage media may use any combination of one or more readable media. The readable media may be a readable signal media or a readable storage media. The readable storage media may include, for example, but not limited to, an electronic, magnetic, optical, electromagnetic, infrared, or semiconductor system, apparatus, or means, or any combination of the above. More specific examples (a non-exhaustive list) of the readable storage media include: an electrical connection having one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage means, a magnetic storage means, or any suitable combination of the above.

The foregoing describes basic principles of the present application with reference to specific embodiments. However, it should be noted that the merits, advantages, effects, and the like mentioned in the present application are merely examples but not limitations, and cannot be considered that these merits, advantages, effects, and the like are essential to the embodiments of the present application. In addition, the specific details disclosed above are intended only for the purpose of illustration and convenience of understanding, and are not limited thereto, and are not intended to limit the present application to the specific details described above.

The block diagrams of components, apparatuses, devices and systems in the present application are merely illustrative examples and are not intended to require or imply that connections, arrangements and configurations must be performed in the manner shown in the block diagrams. As will be recognized by those skilled in the art, these components, apparatuses, devices and systems can be connected, arranged and configured in any manner. Terms such as "comprise", "include", "have" are open words, meaning "include but not limited to", and they can be used interchangeably. Terms "or" and "and" used herein refer to "and/or", and they can be used interchangeably unless the context expressly indicates otherwise. Term "such as" used herein refers to "such as but not limited to" and they can be used interchangeably.

It should also be noted that, in the apparatuses, devices and methods of the present application, components or steps can be decomposed and/or recombined. These decompositions and/or recombination shall be considered as equivalent solutions of the present application.

The foregoing descriptions of the disclosed aspects are provided to enable any person skilled in the art to make or use the present application. Modifications to these aspects are very obvious to those skilled in the art and the general principles defined herein can be applied to other aspects without departing from the scope of the present application. Therefore, the present application is not intended to be limited to the aspects shown herein, but to the widest extent consistent with the principles and novel features disclosed herein.

The foregoing descriptions have been given for the purposes of illustration and description. Furthermore, this description is not intended to limit the embodiments of the present application to the form disclosed herein. Although several exemplary aspects and embodiments have been discussed above, those skilled in the art will recognize some of their variations, modifications, changes, additions, and combinations.

What is claimed is:

1. A method for generating a neural network, comprising:
obtaining an optimal neural network and a worst neural network from a neural network framework by using an evolutionary algorithm;
obtaining an optimized neural network from the optimal neural network by using a reinforcement learning algorithm;
updating the neural network framework by adding the optimized neural network into the neural network framework and deleting the worst neural network from the neural network framework;
determining an ultimately generated neural network from the updated neural network framework; and
applying the ultimately generated neural network for image classification,
wherein each of the plurality of neural networks is normalized into a plurality of network structure modules, and the obtaining an optimized neural network from the optimal neural network by using a reinforcement learning algorithm comprises:
encoding each network structure module in the optimal neural network, to obtain a coding result;
encoding the coding result into a network structure module feature;
selectin to modify a feature processing layer type and a connection mode of each network structure module; and
modifying the feature processing layer type and the connection mode of each network structure module to obtain the optimized neural network.

2. The method for generating a neural network of claim 1, wherein the obtaining an optimal neural network and a worst neural network from a neural network framework by using an evolutionary algorithm comprises:
acquiring a neural network framework comprising N input neural networks randomly initialized, wherein N is an integer greater than 1;
randomly selecting M neural network samples from the N input neural networks, wherein M is an integer greater than 1;
training the M neural network samples to obtain precision of the M neural network samples; and
obtaining the optimal neural network and the worst neural network based on the precision of the M neural network samples.

3. The method for generating a neural network of claim 2, wherein the optimal neural network is a neural network having optimal precision in the M neural network samples, and the worst neural network is a neural network having worst precision in the M neural network samples.

4. The method for generating a neural network of claim 1, wherein the determining an ultimately generated neural network from the updated neural network framework comprises:
training a plurality of neural networks in the updated neural network architecture to enable the plurality of neural networks to converge;
calculating precision of each of the plurality of neural networks which has converged; and
selecting a neural network having optimal precision as the ultimately generated neural network.

5. The method for generating a neural network of claim 1, wherein a step of the obtaining an optimal neural network and a worst neural network, a step of the obtaining an optimized neural network, and a step of the updating the neural network framework are performed in an iterative manner.

6. An electronic device, comprising:
a processor; and
a memory, wherein the memory stores computer program instructions, and when the computer program instructions are executed by the processor, the processor is enabled to perform the following steps:
obtaining, by using an evolutionary algorithm, an optimal neural network and a worst neural network from a neural network framework comprising a plurality of neural networks;
obtaining, by using a reinforcement learning algorithm, an optimized neural network from the optimal neural network;
updating the neural network framework by adding the optimized neural network into the neural network framework and deleting, from the neural network framework, the worst neural network obtained from the evolutionary unit;
determining an ultimately generated neural network from the updated neural network framework; and
applying the ultimately generated neural network for image classification,
wherein each of the plurality of neural networks is normalized into a plurality of network structure modules, and the obtaining an optimized neural network from the optimal neural network by using a reinforcement learning algorithm comprises:

encoding each network structure module in the optimal neural network, to obtain a coding result;

encoding the coding result into a network structure module feature;

selecting to modify a feature processing layer type and a connection mode of each network structure module; and modifying the feature processing layer type and the connection mode of each network structure module to obtain the optimized neural network.

7. The electronic device of claim 6, wherein when the step of obtaining an optimal neural network and a worst neural network from a neural network framework by using an evolutionary algorithm is executed, the processor is enabled to specifically perform the following steps:

acquiring a neural network framework comprising N input neural networks randomly initialized, wherein N is an integer greater than 1;

randomly selecting M neural network samples from the N input neural networks, wherein M is an integer greater than 1;

training the M neural network samples to obtain precision of the M neural network samples; and obtaining the optimal neural network and the worst neural network based on the precision of the M neural network samples.

8. The electronic device of claim 7, wherein the optimal neural network is a neural network having optimal precision in the M neural network samples, and the worst neural network is a neural network having worst precision in the M neural network samples.

9. The electronic device of claim 6, wherein when the step of determining an ultimately generated neural network from the updated neural network framework is executed, the processor is enabled to specifically perform the following steps:

training a plurality of neural networks in the updated neural network architecture to enable the plurality of neural networks to converge;

calculating precision of each of the plurality of converged neural networks which has converged; and selecting a neural network having optimal precision as the ultimately generated neural network.

10. The electronic device of claim 6, wherein when the computer program instructions are executed by the processor, the processor is enabled to perform a step of the obtaining an optimal neural network and a worst neural network, a step of the obtaining an optimized neural network, and a step of the updating the neural network framework in an iterative manner.

11. A non-transitory computer-readable storage media, wherein the computer-readable storage media stores computer program instructions, and when the computer program instructions are executed by the processor, the processor is enabled to perform the following steps:

obtaining, by using an evolutionary algorithm, an optimal neural network and a worst neural network from a neural network framework comprising a plurality of neural networks;

obtaining an optimized neural network from the optimal neural network by using a reinforcement learning algorithm;

updating the neural network framework by adding the optimized neural network into the neural network framework and deleting the worst neural network from the neural network framework;

determining an ultimately generated neural network from the updated neural network framework; and applying the ultimately generated neural network for image classification, wherein each of the plurality of neural networks is normalized into a plurality of network structure modules, and the obtaining an optimized neural network from the optimal neural network by using a reinforcement learning algorithm comprises:

encoding each network structure module in the optimal neural network, to obtain a coding result;

encoding the coding result into a network structure module feature;

selecting to modify a feature processing layer type and a connection mode of each network structure module; and modifying the feature processing layer type and the connection mode of each network structure module to obtain the optimized neural network.

* * * * *